United States Patent
Rosenblum et al.

(10) Patent No.: US 9,164,962 B2
(45) Date of Patent: Oct. 20, 2015

(54) DOCUMENT ASSEMBLY SYSTEMS AND METHODS

(75) Inventors: Lev Rosenblum, Salt Lake City, UT (US); Gianni Taraschi, Arlington, MA (US); Dmitry Gurenich, Brookline, MA (US)

(73) Assignee: Lexprompt, LLC, Salt Lake City, UT (US)

( * ) Notice: Subject to any disclaimer, the term of this patent is extended or adjusted under 35 U.S.C. 154(b) by 609 days.

(21) Appl. No.: 13/525,359

(22) Filed: Jun. 18, 2012

(65) Prior Publication Data

US 2012/0324350 A1    Dec. 20, 2012

Related U.S. Application Data

(60) Provisional application No. 61/499,137, filed on Jun. 20, 2011.

(51) Int. Cl.
- *G06F 17/24* (2006.01)
- *G06F 17/21* (2006.01)
- *G06F 17/22* (2006.01)
- *G06F 17/20* (2006.01)

(52) U.S. Cl.
CPC ............ *G06F 17/21* (2013.01); *G06F 17/2229* (2013.01)

(58) Field of Classification Search
CPC . G06F 17/24; G06F 17/211; G06F 17/30011; G06F 17/30867
See application file for complete search history.

(56) References Cited

U.S. PATENT DOCUMENTS

| | | | | |
|---|---|---|---|---|
| 5,796,948 | A * | 8/1998 | Cohen | 709/206 |
| 6,782,510 | B1 * | 8/2004 | Gross et al. | 715/257 |
| 7,546,334 | B2 * | 6/2009 | Redlich et al. | 709/201 |
| 7,739,289 | B2 * | 6/2010 | McAllister et al. | 707/754 |
| 7,743,336 | B2 * | 6/2010 | Louch et al. | 715/766 |
| 8,074,162 | B1 * | 12/2011 | Cohen | 715/207 |
| 8,205,155 | B2 | 6/2012 | Trotter | |
| 8,490,199 | B2 * | 7/2013 | Zalewski | 726/26 |
| 2002/0007371 | A1 * | 1/2002 | Bray | 707/501.1 |
| 2004/0001086 | A1 * | 1/2004 | Brown et al. | 345/744 |
| 2004/0111639 | A1 * | 6/2004 | Schwartz et al. | 713/201 |
| 2007/0255791 | A1 * | 11/2007 | Bodlaender et al. | 709/206 |
| 2009/0094674 | A1 * | 4/2009 | Schwartz et al. | 726/1 |
| 2009/0100346 | A1 * | 4/2009 | O'Sullivan et al. | 715/743 |
| 2009/0132651 | A1 * | 5/2009 | Roger et al. | 709/204 |
| 2013/0174229 | A1 * | 7/2013 | Grason et al. | 726/4 |

OTHER PUBLICATIONS

Acrolinx IQ 2.0 press release; http://www.acrolinx.com/acronews_en/items/acrolinx-iq-20-available-now.html; To best of Applicants' knowledge, reference published Aug. 31, 2010.

XpressDox desktop software description webpage; http://www.xpressdox.com/desktop/; To the best of Applicants' knowledge, this reference was published in 2009.

(Continued)

*Primary Examiner* — Nicholas Augustine

(57) ABSTRACT

Embodiments of the present invention relate to devices, systems, and methods for assembling and/or creating documents with the aid of a computer system. One or more embodiments provide document assembly systems and methods. More specifically, the document assembly system may allow the user to retrieve relevant texts or text segments, which have been previously created, and may allow the user to incorporate such texts and/or text segments into a document.

20 Claims, 11 Drawing Sheets

(56) References Cited

OTHER PUBLICATIONS

HotDocs products webpage; http://www.hotdocs.com/products; Apr. 2010. (Document retrieved from http:/web.archive.org).

West KM product description webpage; http://store.westlaw.com/products/services/westkm; To the best of Applicants' knowledge, this reference was published on Mar. 2011.

West KM Product Sample Screen; http://store.westlaw.com/products/services/westkm/images/L-366689_WestkmTransactions.jpg; To the best of Applicants' knowledge, this reference.

Wichdraft.com home webpage; http://wichdraft.com; Apr. 2010. (Document retrieved from http:/web.archive.org).

Litera products webpage; http://litera.com/change-pro.aspx; Jun. 2011. (Document retrieved from http:/web.archive.org).

Rapidocs home webpage; http://rapidocs.net; Apr. 2010. (Document retrieved from http:/web.archive.org).

BusinessIntegrity products webpage; http://www.business-integrity.com/products/contractexpresscom/default.html; May 2010. (Document retrieved from http:/web.archive.org).

ProDoc document assembly webpage; http://prodoc.com/general/document-assembly.asp; Jun. 2009. (Document retrieved from http:/web.archive.org).

Pathagoras products webpage; http://www.pathagoras.com/products.html; Jun. 2009. (Document retrieved from http://web.archive.org).

Brightleaf automated document assembly webpage; http://brightleaf.com/capabilities/document-assembly; Sep. 2010. (Document retrieved from http://web.archive.org).

Lucene in Action, Second Edition, Manning Publications, 2010.

\* cited by examiner

DOCUMENT ASSEMBLY SYSTEMS AND METHODS

CROSS-REFERENCE TO RELATED APPLICATIONS

The present application claims priority to U.S. Provisional Patent Application No. 61/499,137, filed Jun. 20, 2011, entitled "Document Assembly Systems and Methods" the entire content of which is incorporated by reference herein.

BACKGROUND OF THE INVENTION

1. The Field of the Invention

This invention relates to systems, methods, and apparatus for creating documents.

2. Background and Relevant Art

In an information-based economy, written documents may be central to many enterprises. Examples of such documents include legal documents, medical reports, law-enforcement (e.g., police) reports, legislative documents, regulatory documents, grant solicitation documents, and grant proposal documents. As a result, professionals in many fields may spend a significant portion of time writing and editing various documents. Typically, documents are reread and edited multiple times to achieve acceptable language and structure in the document. The legal profession is one example of a field where professionals may spend an inordinate amount of time composing and editing written documents, such as contracts, litigation documents, patents, and client letters.

Computers and/or computer systems may enable a drafter to compose and edit documents. For example, the drafter may use word processing software for generating documents. The drafter also may use a document assembly system to create documents. A typical document assembly system may allow the drafter to enter information into a form. Subsequently, such a system may generate a document using preset text blocks and/or a framework based on the information in the information entered by the drafter. Although such document assembly systems may improve the efficiency of document creation processes, typical document assembly systems lack flexibility to create customized documents, which may be desired by the drafter.

BRIEF SUMMARY OF THE INVENTION

In one or more embodiments, the present invention provides a document drafting system and methods that may facilitate reuse of previously created text. The document drafting system may include computer executable code executed on a general purpose or a special purpose computer. In some instances, reusing previously created text may improve drafting productivity. More specifically, the document drafting system may reduce time required for a user to formulate, enter, and/or proofread sentence segments, sentences, paragraphs, entire documents, or combinations thereof. Furthermore, the document drafting system may increase convenience and/or reduce time required to locate a desired or suitable existing text.

One embodiment includes a computer system for assembling a document. The computer system includes one or more processors, a system memory, a display capable of providing information to a user, the display controlled by the one or more processors, and one or more computer-readable storage media having stored thereon computer-executable instructions. When executed by the one or more processors, the computer-executable instructions cause the computer system to implement a method for assembling a document. The method includes an act of receiving at least one word entry from the user and an act of retrieving a plurality of relevant texts from stored text at least partially based on the received at least one word entry from the user. The method also includes an act of displaying the relevant texts on the display and an act of receiving at least one selection of the relevant text from the user. The method also includes an act of adding the received at least one selection of the relevant texts to a document.

Another embodiment includes a computer program product comprising one or more computer-readable storage media having stored thereon computer-executable instructions that, when executed by one or more processors of a computer system, cause the computer system to implement a method for assembling a document. The method include an act of receiving at least one word entry from a user and an act of retrieving a plurality of relevant texts from stored text at least partially based on the received at least one word entry from the user. The method also includes an act of displaying the relevant texts on the display and an act of receiving at least one selection of the relevant texts from the user. Moreover, the method includes an act of adding the received at least one selection of the relevant texts to a document.

Yet one other embodiment includes a method, implemented at a computer system that includes one or more processors and system memory, for assembling documents. The method includes an act of receiving at least one word entry from a user and an act of retrieving a plurality of relevant texts from stored text at least partially based on the received at least one word entry from the user. The method further includes an act of displaying the relevant texts on the display and an act of receiving at least one selection of the relevant texts from the user. The method also includes an act of adding the received at least one selection of the relevant texts to a document.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In one or more embodiments, the present invention provides a document drafting system and methods that may facilitate reuse previously created and/or existing text. The document drafting system may include computer executable code executed on a general purpose or a special purpose computer. In some instance, reusing previously created text may improve drafting productivity. More specifically, the document drafting system may reduce time required for a user to formulate, enter, and/or proofread sentence segments, sentences, paragraphs, entire documents, or combinations thereof. Furthermore, the document drafting system may increase convenience and/or reduce time required to locate a desired or suitable existing text. As used herein, the term "document" refers to an electronic document that has text.

The document drafting system also may enable generation of a database containing text from previously created documents. For instance, the document drafting system may parse existing documents or text to create and/or update the database containing text. In particular, the document drafting system may identify desirable text segments, store and/or index such segments. Moreover, the document drafting system may store one or more text segments in the database containing text.

In some embodiments, during drafting, the document drafting system may enable the user to query the database containing text and may retrieve text therefrom. Additionally, the document drafting system also may provide an integrated drafting environment. For example, such an integrated drafting environment may allow the user to query the database for desired text, receive results of the query, select one or more of the received results, add text from the selected results into a document, or perform one or more combinations thereof. Thus, the document drafting system may be used to draft a variety of documents, including but not limited to legal documents, medical notes, reports, legislation, administrative regulations, technical documents, news reports, etc. Examples of legal documents include contracts, litigation documents, patents, various transactional documents, etc.

Figure 1A:
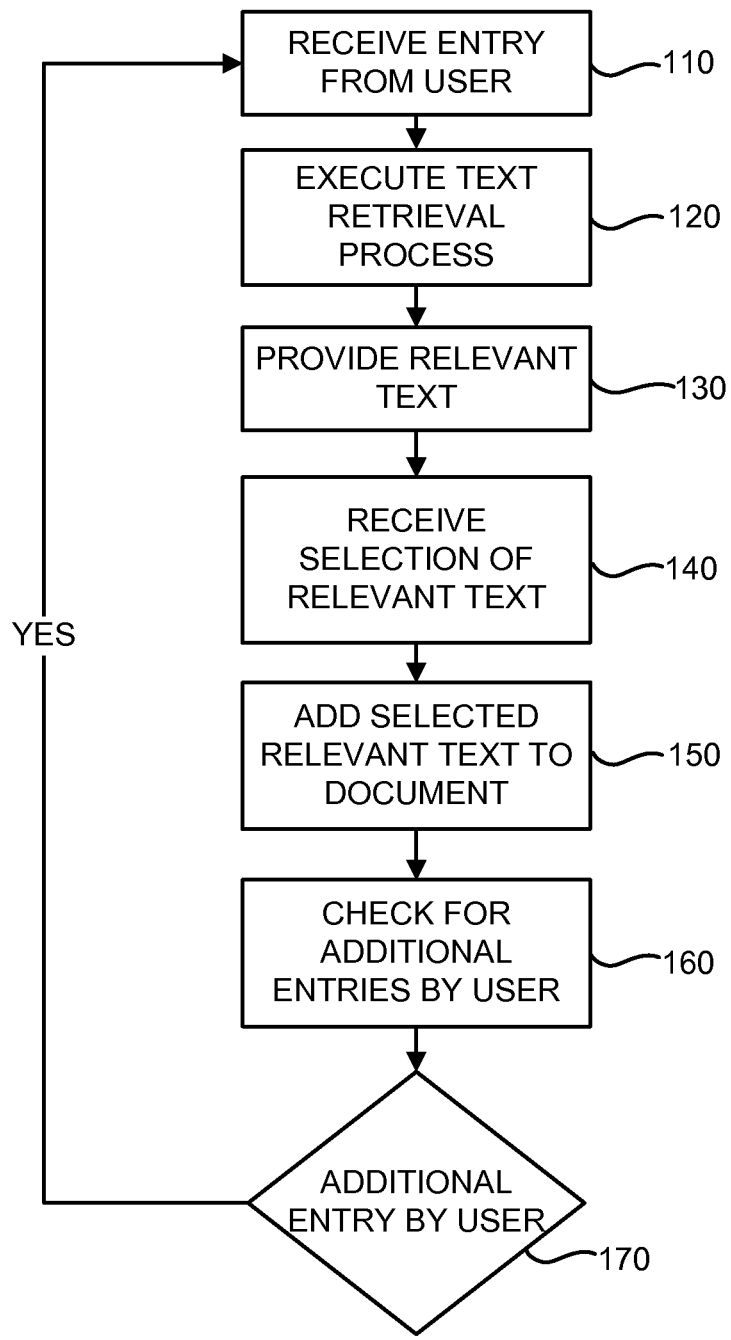
FIG. 1A illustrates a flowchart of a method of assembling a document in accordance with one embodiment.

As described above, the document drafting system may provide the user with text in response to the user's one or more queries. More specifically, in some embodiments, the document drafting system may retrieve text in response to entries made by the user. As used herein, the terms "entry" or "entries," as applicable, refer to entries of one or more words made by the user. Operations performed by a document drafting system, for example, may include acts, as illustrated in a flowchart of FIG. 1A, that may be executed by or on a computer system that may comprise one or more processors. The acts of FIG. 1A, and others presented herein, may be implemented while a user is writing a document, and may enable a user to readily assemble a document by reusing preexisting text, such as word combinations, clauses, sentences and/or paragraphs. The preexisting text may have been previously drafted by the user or by other writers. In this manner the user need not rewrite preexisting text, and may readily include the desired preexisting text(s) in one or more locations in his document.

The method may include the computer system receiving one or more entries from the user (act 110). As described above, the user may make such entries while creating a document. For instance, the computer system may receive entries as the user enters text into the document. The entries received by the computer system may include entries the user makes while creating the document. For example, in some embodiments, as further described below, the user may type text into a word processor application (forming words, sentence, fragments, sentences, etc.), which may be the entries that the computer system receives from the user in act 110. The term "word processor" refers to any program or software that allows a user to create documents, edit documents, save documents, format documents, or a combination thereof.

Additionally or alternatively, a user's speech may be collected via a microphone, and speech recognition software may transcribe the user's speech into text that may form words, sentence fragments, sentences, etc., and which may be the entries the computer system receives from the user in act 110. For example, speech recognition software by Nuance Communication, Inc., such as Nuance Dragon NaturallySpeaking™ speech recognition software, may be employed to convert a user's spoken words to text, including but not limited to text entered in applications such as word processors, email applications, web browsers, etc. Furthermore, the entry may include select text written by the user in the document (e.g., the most recent written text or a selected fragment of the written text, such as a specific number of words last entered by the user). In one or more embodiments, the entry may be one or more search terms. The search terms may be provided by the user outside of a text document that the user may be drafting. For example, in act 110, the computer system may receive entries made by the user in a search line, as further described below. Furthermore, the search line may be displayed to the user as part of the word processor application and/or as part of a standalone system.

Accordingly, the entry or entries received from the user may be search terms that, for example, may be used to query a database. Such search term entries, as described above, may be the words added to a documents (e.g., during creation thereof) or in a search line, which may be outside of the document. For example, as the user is creating the document, the user may add the following text to the document: "'Change of Control' means the consummation of a transaction in which any entity becomes . . . ." Any portion of the entered text, as preset by the user and/or as may be determined by the document drafting system, may be the entry received by the computer system from the user, in act 110. In some embodiments, as described above, the entry may be a preset number of words as counted from a preset position in the document and in a preset. For instance, the entry may comprise a certain number of words (e.g., five words, four words, three words, or two words), counted to the left from a current position of the cursor in the document. It should be noted, however, that the number of words, starting position and direction of the count may be changed as desired by the user and/or by the document drafting software, as further discussed below.

Alternatively or additionally, in at least one embodiment, the entries received from the user in act 110 may be commands. More specifically, the entries may be commands that correspond to a specific text that the user desires to add to a document. For instance, the "command" type of entry may trigger the document drafting system to retrieve relevant text, as further described below, which is associated with the particular comment. As used herein, the term "relevant text" refers to certain text retrieved and/or provided by the document assembly system; such text may be retrieved based on certain parameters and/or requirements defined within the document assembly system (e.g., a query string used for querying a database containing text).

Upon receiving the entry from the user, the computer system may execute a text retrieval process (act 120), whereby the computer system may retrieve relevant text from stored text in response to the entry received from the user. In some embodiments, the stored text is contained within a text repository, such as a database. Thus, for example, the text retrieval process may include querying the text repository (e.g., querying the database, such as an SQL database).

The stored text also may comprise text stored in non-volatile (e.g., storage devices such as hard disks, optical discs, magnetic tape, flash devices) and/or volatile memory devices (e.g., RAM). The stored text may include text from one or more documents, which may be parsed therefrom and/or stored in the text repository. The text retrieved during the text retrieval process of act 120 may have been written, at least in, part by the user and/or by others, for instance, as part of one or more documents. In some embodiments, the stored text and/or the text retrieved during the text retrieval process of act 120 may include text from a document that is presently open, and which the user may be presently drafting or editing. In some embodiments, the text retrieved during the text retrieval process of act 120 may include text not created by the user, which may be stored in one or more databases. Such text may include text from public and/or private documents, for example, legal documents (e.g., case documents), legislative documents, regulatory documents, patents and patent applications, financial filing documents (e.g., SEC filing documents), medical and pharmaceutical texts, encyclopedic texts, news achieves, web pages, etc.

In some embodiments, the stored text may be stored in a database as text fragments, such as clauses, sentences, and/or paragraphs. The text fragments, sentences, and/or paragraphs may be tagged or identified with various identifying information, such as one or more of sentence boundaries, named entity tags, parts of speech tags, keywords, parse trees, dependency trees, words relevant to the identified keywords (e.g., synonyms, which may be obtained from WorldNet), and chunks and/or super-chunks of words. A chunk is a portion of a sentence comprising several (e.g., two or more, three or more, or four or more) words, and does not contain all the words of the sentence. In some embodiments, a chunk is a short phrase or a meaningful portion of a sentence. In some embodiments, a chunk includes at least one verb (e.g., one or more, two or more, or three or more). In some embodiments, a chunk includes no more than one verb. In other embodiments, a chunk includes no more than two verbs. Depending on user's preferences, however, chunks may include more than one verb. The text fragments, sentences, and/or paragraphs may (but do not have to) be stored in a database (e.g., a relational database, such as Microsoft SQL Server Express database).

The text retrieval process that may be executed in act 120 may include one or more text search processes by which the computer system searches the stored text and returns relevant text based on the one or more entries (e.g., search terms such as one or more words) from the user. The text retrieval process may include a full-text search where all the words in the stored text are examined so as to find relevant text. Alternatively or additionally, the text retrieval process may utilize an index of the stored text (e.g., where the index may include a list of terms), which may have been created previously. The index or the database may be searched during the text retrieval process so as to retrieve the relevant text. Various search algorithms, which are known to those skilled in the art, may be used to perform the search of the stored text, including SQL querying, if the text is stored in database.

In some embodiments, the text retrieval process includes a search process that is performed on sentences only and/or for parts of speech. Such a process may utilize stored text that has been parsed at least partially based on sentence boundaries and/or parts of speech (as described below for the method of FIG. 8). Search results may be ranked higher if the search word is a particular part of speech (e.g., a verb). Alternatively, or additionally, search results may be ranked higher when search words appear in conjunction with another in the same sentence.

The relevant text may comprise stored text that substantially matches the one or more entries from the user. Alternatively or additionally, the relevant text may comprise stored text in a document that follows and/or precedes text that substantially matches the one or more entries from the user. For example, the relevant text may include text fragments, such as a sentence or parts of sentence, which include substantially matching text for the one or more entries from the user but also may include additional text following or preceding the substantially matching text. In some embodiments, a plurality of relevant texts may be retrieved.

The plurality of retrieved relevant texts may be ranked based on how closely the retrieved relevant texts include substantially matching text for the one or more entries from the user. For example, the results may be ranked based on the matching of the number of words in an entry from the user and/or the sequence of the words in an entry from the user. A highest rank may be provided to relevant text that includes the most same words as the entry from the user and/or most of the same words in a similar sequence as the entry from the user.

Additionally, the relevant texts may be ranked based on most commonly occurring word combinations (e.g., within the database containing the stored text; within another corpus of parsed text). For example, when the user provides search terms, such as words X1, X2, and X3, the results may be ranked (and displayed in the order of ranking) based on the most commonly occurring combination or sequence of these words within a sentence or a chunk stored in the database. Additionally or alternatively, the ranking may be based on the most commonly occurring sequence of the search words within another database (e.g., as noted above, a corpus of parsed text). Various other ranking algorithms known to those skilled in the art may be used to produce the desired rankings of the results.

In one or more embodiments, the computer system may compute a readability metric and assign the same to the stored text. For example, the readability metric for a particular sentence or chunk may be calculated by comparing frequency of use of a particular word sequence or sequences (e.g., particular verb-noun arrangement) within such sentence or chunk with the average use within a corpus. In some instances, the corpus may be the collective stored text. Additionally or alternatively, the corpus may be other, parsed corpus from one or more sources, such as newspapers, legal documents, etc.

In some embodiments, relevance ranking of the relevant text may at least in part be determined by a user's previous search string and subsequent selections of the results, which may be stored under a user's profile. The user profile may include historical information, such as historical information relating to the use of the document assembly system. For example, the historical information may include information about relevant text that the user has previously incorporated into other documents he has drafted. More recent relevant text that the user has previously incorporated into other documents may be given more weight in the relevance ranking method. For instance, the historical profile may include relationships between search terms and selected relevant texts, search term sequences and corresponding sequences in the selected relevant texts, types of documents corresponding to the search terms (which were being created by the user during the search and/or from which the user selected the relevant text), etc.

The computer system may provide the retrieved relevant text to the user (act 130). Providing the retrieved text to the user may include presenting the retrieved text to the user. The retrieved relevant text may be presented via a visual display. Alternatively or additionally, the retrieved relevant text may be presented via audio, such as speech that may be created via text-to-speech computer processes. The retrieved relevant text may be presented as a list of items, where the list may be arranged in any desired order, and where the desired order may be specified by the user or by the software or computer system, as previously defined. For example, the desired order for the relevant texts may be in descending or ascending relevance rank, as determined by the ranking method. Alternatively or additionally, the desired order for the relevant texts may be in descending or ascending dates of creation or last modification. Alternatively or additionally, the desired order for the relevant texts may be based on the author's name and/or organizational affiliation of the relevant texts, such as in ascending or descending alphabetical order of the author's name and/or organizational affiliation.

In some embodiments, the presented relevant text to the user and a document that is presently being drafted are viewable simultaneously. As described in more detail below, the presented relevant text and the document may be displayed simultaneously via a split-screen display. Furthermore, the document assembly system may update the relevant text presented to the user, while the user drafts the document. In particular, as described below, the document assembly system may obtain a desired or predetermined number of words entered or selected by the user during the drafting process and may use such words as search terms for obtaining the relevant text.

The user may select one or more of the presented relevant texts. The user may select text by moving a cursor (e.g., via an cursor control device, such as a mouse, touchpad, touch display) over the text and selecting the text via a specified text-selection process (e.g., menu button and/or a cursor control device button), such as clicking one or more times on a cursor control device button. In some embodiments, the user may select the relevant text by highlighting a portion of presented text. Additionally or alternatively, the user may drag-and-drop the relevant text (as part of the selection process). Such dragging and dropping may be achieve with the aid of a number of input devices, such as a mouse, a keyboard, a touch screen, a microphone (for speech activated commands), and a combination thereof. Thus, the computer system may receive the selection of the relevant text in act 140.

The user may then provide an indication that he wants to add the selected relevant text to a document, for example, to an open document that he may be drafting. The user may choose to add the selected text to a selected document at a selected location in the document. In some embodiments, the selected location to add the selected text may the location of a cursor, such as the cursor in a word processing environment for a presently open document. In response, the computer system may add the selected relevant text to the selected document (act 150), such as a document that is currently being drafted and/or may be open. Once the text is added to the document, the process may be repeated when/if the user provides an additional entry (acts 160 and decision point 170).

Figure 1B:
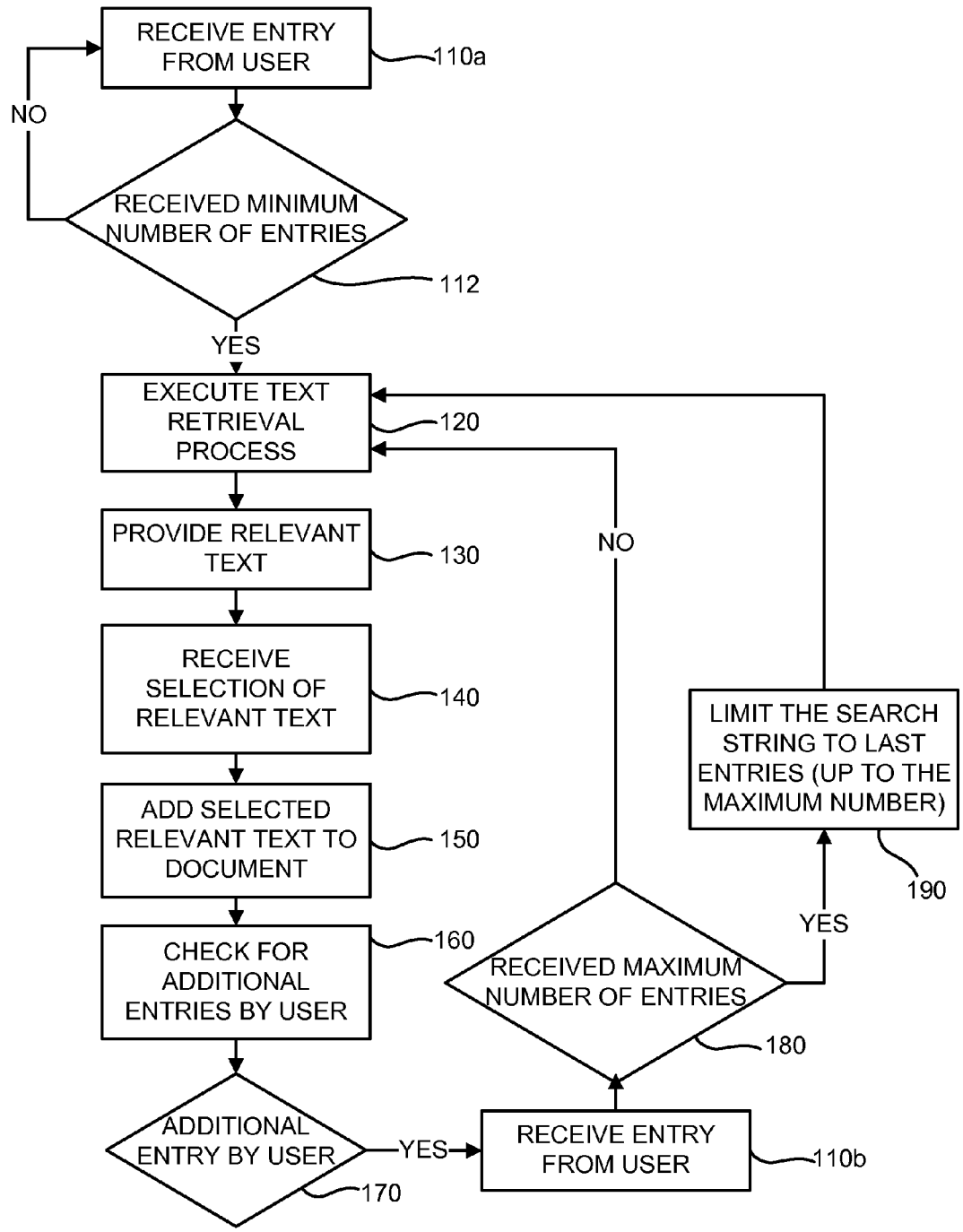
FIG. 1B illustrates a flowchart of a method of assembling a document in accordance with another embodiment.

As described above, the relevant text may be presented to the user as the user is drafting the document. For instance, as illustrated in FIG. 1B, the document assembly system may receive entry from the user (act 110a) and may subsequently check whether a minimum number of entries have been received in act 112. If the minimum number of entries has been received from the user, the document assembly system may proceed in a similar manner as described above in connection with FIG. 1A. Namely, the document assembly system may execute text retrieval process (act 120) and may provide the relevant text to the user (act 130). Additionally, the document assembly system also may receive selection of relevant text (act 140) and may add the selected relevant text in the act 150.

As described above, in some embodiments, the search process or retrieval of relevant text may commence only when the document assembly system has received the minimum number of entries from the user. For example, if the minimum number is four (4), once the user has entered four words, the document assembly system will proceed to retrieve relevant text. Additionally or alternatively, as the user makes additional entries (e.g., types new words in the document; speaks new words to a speech recognition system) the document assembly system may check for additional entries from the user in act 160 (and decision point 170) and may receive additional entries from the user in act 110b. Furthermore, the document assembly system may incorporate an upper limit on the number of entries used for retrieving relevant text (e.g., in a search string or a query). For instance, the document assembly system may check whether the received number of entries has reached a maximum number of entries in act 180. If the maximum number of entries has not been reached, the document assembly may proceed to execute text retrieval process (act 120). Alternatively, if the maximum number of entries has been reached, the document assembly system may limit the search string (or generally the number of entries used for retrieving text) in act 190 and may subsequently execute text retrieval process (act 120).

The minimum and/or maximum number of entries may be predetermined (e.g., fixed by the user or within the document assembly system) or may be defined by an algorithm. For instance, the minimum and/or maximum number of entries may be static number(s), for example, chosen by the user. Additionally or alternatively, the minimum and/or maximum number of entries may be determined by the document assembly system based on one or more parameters; for instance, the minimum and/or maximum number of entries may be at least partially based on the load on the database storing text, and/or data transfer rate.

Additionally, it should be noted that the document assembly system may execute all or some of the acts identified herein. Accordingly, the document assembly system may incorporate an upper and/or a lower limit for the number of entries used in the text retrieval process. Thus, for example, as the user enters text (e.g., types or speaks words), the document assembly system may select a minimum and/or maximum number of words from the entered text (e.g., in the line preceding the cursor) to use in the text retrieval process (of act 120). Thus, the relevant text provided by the document assembly system in act 130 may be updated based on the retrieved results, which may be at least partially based on the number of words used to execute the text retrieval process in act 120 (e.g., number of words used in the search string or query).

Figure 2:
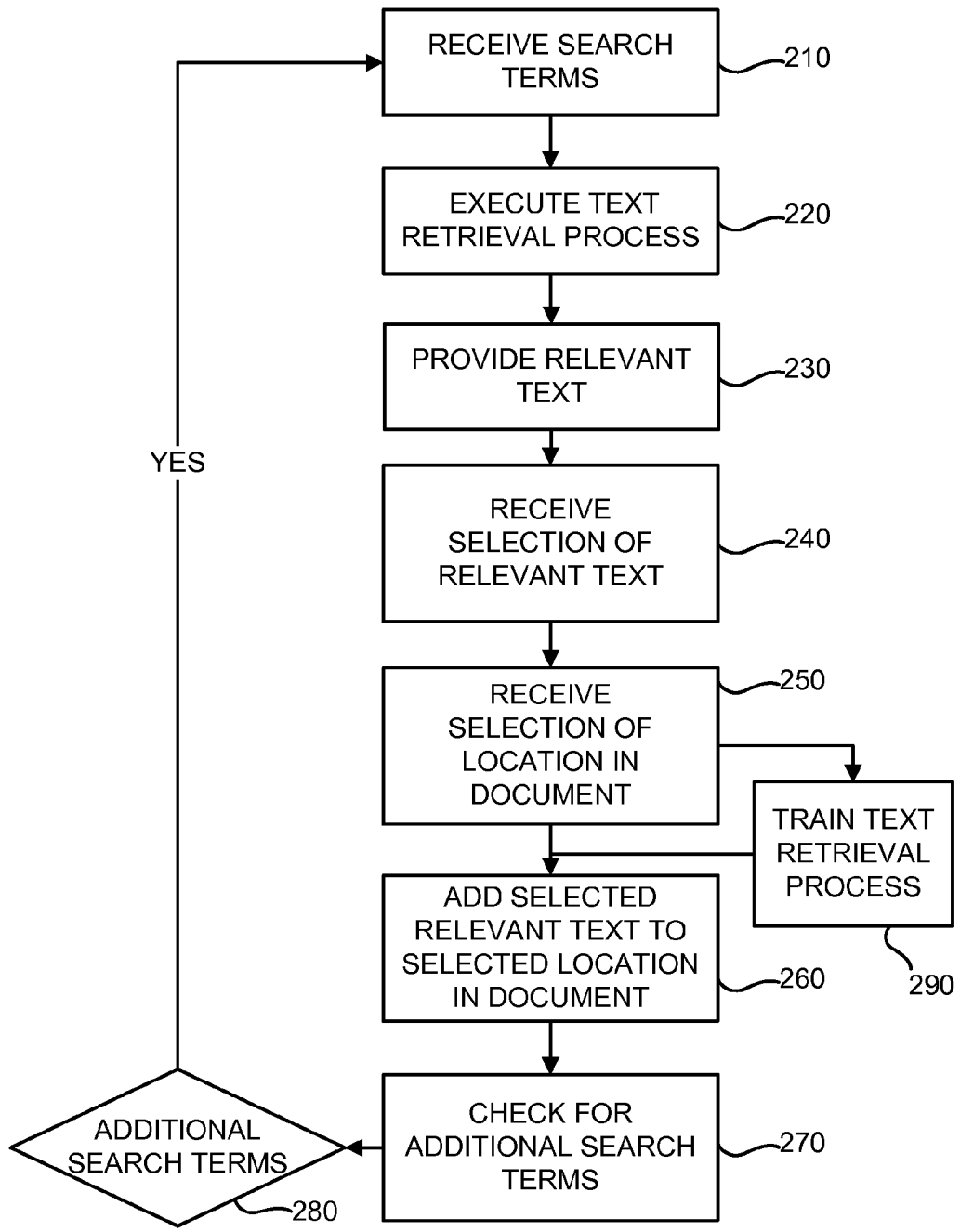
FIG. 2 illustrates a flowchart of a method of assembling a document in accordance with yet another embodiment.

FIG. 2 is a flowchart of acts for assembling a document that may be performed by the document assembly system in accordance with one embodiment of the present inventions, as may be implemented by a computer system that may comprise one or more processors. The document assembly system may perform an act of receiving one or more search terms from a user (act 210).

In one embodiment, a search prompt is presented to the user, and the user may enter one or more search terms in the search prompt. The search prompt may be a line visible on an interface (e.g., a display) of the computer system as a box in which the user may enter search terms. Additionally or alternatively, the search prompt may be invisible to the user—for example, the search terms may be entered as speech commands recognized by speech recognition software.

The search terms may include one or more words. Additionally or alternatively, the search terms may include one or more word sequences (i.e., a collection of words in a specific order), as may be indicated by the user entering predetermined marks (e.g., quotation marks) at the beginning and end of a word sequence as well as Boolean terms designating relative position and/or presence of text segments (such as words or word combinations) in the searched/stored text. In some embodiments, the user may specify whether the relevant text may include other words in-between the words of the entered word sequence, and/or whether the retrieved text should include only the words of the entered word sequence with no other intervening words. The user may be provided the option to specify whether word stemming and/or synonyms should be utilized for the entered search terms.

Upon receiving the search terms from the user, the computer system may execute a text retrieval process (act 220), as described for act 120 above. The computer system may provide (e.g., present) the relevant text to the user (act 230), as described for act 130 above. The user may select one or more of the presented relevant texts, and the computer system may receive the selection of the relevant text (act 240), as described for act 140 above.

The user may then provide an indication that he wants to add the selected relevant text to a document, such as an open document that he may be drafting. The user may provide an indication to add the selected text to a selected document at a selected location in the document, and the computer system may receive the selected location in the document (act 250). In some embodiments, the selected location to add the selected text may be the location of a cursor, such as the cursor in a word processing environment for a presently open document. In response, the computer system may add the selected relevant text to the selected document (act 260), such as a document that is currently being drafted and/or may be open. Once the text is added to the document, the process may repeat when the user provides an additional entry (acts 270, 280).

In some embodiments, the text retrieval process may be trained (act 290). The training of the text retrieval process may be performed at least partially based on the selection of the relevant text by the user. Training of the text retrieval process may include updating a user profile that may include selection frequency weightings for previously selected relevant texts and corresponding search terms and/or search strings used. The selection frequency weightings associated with specific relevant texts may increase with an increasing frequency of user selections and additions of the specific relevant texts to documents. Presented relevant texts may be at least partially ranked based on the selection frequency weightings in the user profile and may be presented to the user in decreasing or increasing ranking order, as may be performed in act 230.

Figure 3:
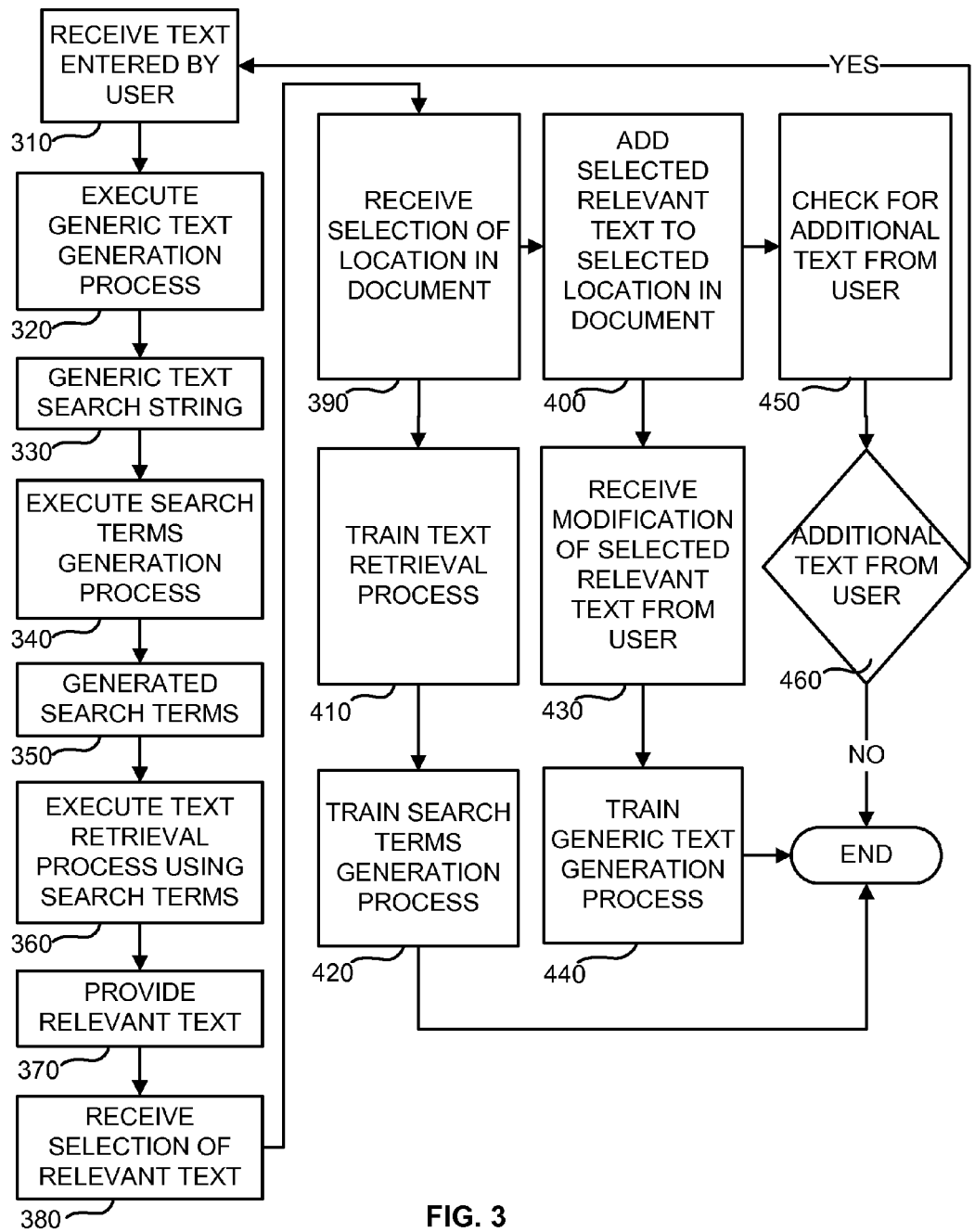
FIG. 3 illustrates a flowchart of a method of assembling a document in accordance with yet another embodiment.

FIG. 3 is a flowchart of acts performed by the document assembly system in accordance with at least one embodiment, in assembling a document, as may be implemented by a computer system that may comprise one or more processors. The document assembly system may provide for the search and presentation of relevant text at least partially based on the text in an open document that the user is drafting. The search and/or presentation of the relevant text to a user may be performed as the user writes (e.g., types or creates via speech-to-text input or other means of input) the document without the user being required to enter search terms. The search and/or presentation of relevant text to the user may be performed repetitively in response to the writing of text (e.g., words or word combinations) most recently provided by the user in the document. In this manner, a user may view and/or select relevant text that he wishes to incorporate into the document he is writing.

The method shown in FIG. 3 may comprise receiving text entered by a user (act 310), whereby the text may be a portion (e.g., a word or word combination) of the document being drafted. The text may be the most recent portion of the document being drafted, such as a number of words that have most recently been written by the user. The number of words may be specified by the user and/or may be a predefined parameter (e.g., as may be set by a configuration process and/or file). In some embodiments, the text received in act 310 may be one or more words in the document being drafted that the user may select, such as by highlighting text (e.g., using a cursor).

Upon receiving the text entered by the user, the computer system may execute a generic text generation process (act 320) using the text entered by the user as input. The generic text generation process may include utilizing a named entity recognition process to identify named entities in the received text, using methods for named entity recognition known by those of skill in the art. Named entities may include proper names (e.g., of people, organizations, nations, states, cities), dates and times. The generic text generation process may then generate generic text search string 330 by removing at least one of the named entities from the text entered by the user. In some embodiments, all identified named entities are removed to generate generic text.

The generic text search string may then be used to obtain relevant text from stored text. For example, the generic text search string may be used to search a database of stored text. Search terms may be generated from the generic text, wherein the computer system may execute a search terms generation process (act 340) that may generate search terms 350. In one embodiment, the search terms generation process may include identifying parts of speech, identifying synonyms, generating a parse tree, and/or generating a dependency tree from the generic text and using one or more of these identifiers to search for relevant text.

The computer system may then execute a text retrieval process using the search terms (act 360), as described for act 120 above. In some embodiments, the search terms used to execute the text retrieval process are viewable by the user. In other words, the entry that is provided to the computer system and subsequently used to retrieve relevant text may be displayed by the computer system to the user. Hence, in the instance where the entry is text entered by the user in a document (e.g., wherein the entry is a predetermined number of words entered last), the computer system may display such entry, so the user may immediately know which words are being used as the entry for retrieving relevant text. The computer system may provide (e.g., present) the relevant text to the user (act 370), as described for act 130 above. The search terms used to execute the text retrieval process may be presented in conjunction with the relevant text, such as in a common window. The user may select one or more of the provided relevant texts, and the computer system may receive the selection of the relevant text (act 380), as described for act 140 above.

The computer system also may give the user a choice of one or more databases (containing stored text) to query for relevant text. Such databases may be located on and/or connected to one or more computers and may be connected together through a network. Additionally, the computer system may allow the user to query databases, indexes, and other storage mechanisms that do not contain stored text (as used herein). For instance, the user may direct the computer system to submit the entry (e.g., latest string or words entered in a document) to an Internet search engine, such as Google, Bing, Yahoo, or other search engines. Accordingly, in addition to providing the user with relevant text, in response to the entries provided by the user, the computer system also may submit the user's entry to an Internet search engine and provide (e.g., display) search result produced or retrieved by the Internet search engine. Similarly, the entry also may be submitted to other search facilities and/or searchable databases by the computer system. Likewise, results obtained or received from such search facilities and/or searchable database also may be provided to the user.

The user may provide an indication of a location in the document where the selected relevant text should be added, and the computer system may receive this information (act 390), as was previously described for act 250 above. The computer system may add the selected relevant text to the selected location in the document (act 400), as was previously described for act 260 above. Once the text is added to the document, the process may repeat when the user enters additional text in the document (acts 450 and 460), and as such the presentation of the relevant text to the user may be performed repetitively (e.g., after every three or more user-entered words, after every five or more user-entered words, after every ten or more user-entered words) in response to text most recently entered by the user in the document.

One or more other optional processes may be performed, which may enhance the performance of the document assembly system. When information from one of such processes is not used by another, two or more of these processes may be performed in parallel. Alternatively, such processes may be performed sequentially, or as a combination of parallel and sequential processes. One such optional process is text retrieval training process (act 410), which was previously described for act 290 above. The computer system may perform the text retrieval process after receiving the selection of a location in the document (act 390) or after the text is added to the selected location in the document (act 400). Another such optional process may also include the training of the search terms generation process (act 420). The training may be at least partially based on the frequency of word or word sequence usage within the stored text and/or may be based on search terms used and subsequent selection(s) made by a specific user. In some embodiments, specific search term(s) may be correlated with a specific subsequent selection, which may be ranked higher in subsequent search results in response to the same or similar search terms entered by the same (and/or by other) user(s).

Other optional processes may be related to enhancing the quality (e.g., usefulness or level of relevancy) of the relevant text provided to the user. Such processes may include training processes that may improve any named entity recognition processes that may be used by the document assembly and associated methods. In particular, the document assembly system may train search terms generation process (act 420). For instance, if a named entity recognition process is employed to present relevant text to the user that is a generic version of some stored text (e.g., absent named entities), and some named entities are not identified by the process, the user may choose to modify (e.g., delete and/or replace) any remaining named entities in the selected text so as to suit their particular situation. Additionally or alternatively, the document assembly system may receive modifications of selected relevant text from the user (act 430), which, for example, may include an indication by the user that the modified text is one or more named entities. In some embodiments, the document assembly system may present a user interface, such as a menu, with one or more options associated with named entity training. The user might be provided with the option to highlight named entities in the selected relevant text and then select a named entity training option (e.g., in the menu). The named entity recognition process may then be trained to identify the missed named entities (act 440), as is known by those of ordinary skill in the art. The training process enables the named entity recognition process to improve with use and with input from one or more users.

Figure 4:
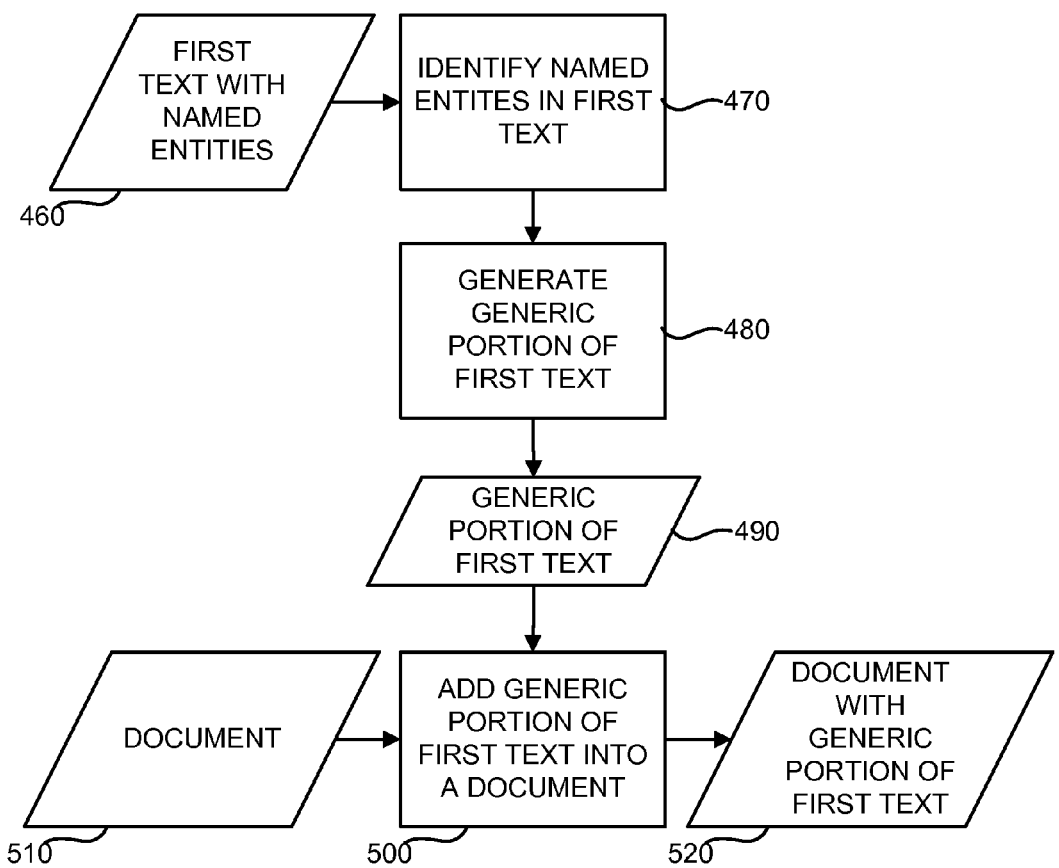
FIG. 4 illustrates a flowchart of a method of assembling a document, in accordance with yet one other embodiment.

FIG. 4 is a flowchart of acts performed by the document assembly system, in accordance with one embodiment of the invention, for assembling a document, as may be implemented by a computer system that may comprise one or more processors. In some embodiments, the document assembly system may identify one or more named entities in a first text, and add a generic portion of the first text into a document, wherein the generic portion is absent at least one of the named entities (e.g., all of the identified named entities).

First text 460 provided to the computer system may be text from an existing document. In some embodiments, the first text 460 may be part of a database. The computer system may proceed to identify named entities in the first text (act 470), as may be achieved using named entity recognition processes. The computer system may proceed to generate a generic portion 490 of the first text, by removing at least one of the identified names entities (e.g., all of the identified named entities) from the first text (act 480).

A document may be assembled by adding the generic portion 490 of the first text into a document 510 (act 500), so as to create a document 520 including the generic portion of the first text. In some embodiments, document 510 may be a document that is being drafted by a user. The user may provide a selection, to the computer system, of at least a portion of the first text 460 to add to document 510. The computer system may thus receive the selection of at least one portion of the first text from the user, and the addition of the generic portion of the first text into the document may be performed by the computer system, at least in part, in response to the user's selection from the first text.

In some embodiments, the computer system may be further programmed to incorporate one or more replacement named entities into the document with the generic portion of the first text that is added to the document. The computer system may utilize a mapping between the one or more named entities in the first text and the one or more replacement named entities so as to incorporate the one or more replacement named entities into the document with the generic portion of the first text that is added to the document. The mapping between the one or more named entities and the one or more replacement name entities may be determined, at least in part, based on information provided by the user. In one embodiment, a mapping may be provided by named entity variables specified for the document being drafted. For example, in the case of legal documents, some typical named entity variables may include the defendant and the plaintiff names and places of residence. In another example, in the case of clinical medical notes, some typical named entity variables may include the patient's name and date of examination. Although specific document examples are provided above, it should be appreciated that the methods described herein may be utilized for any type of document, including but not limited to legal and/or medical notes.

Figure 5:
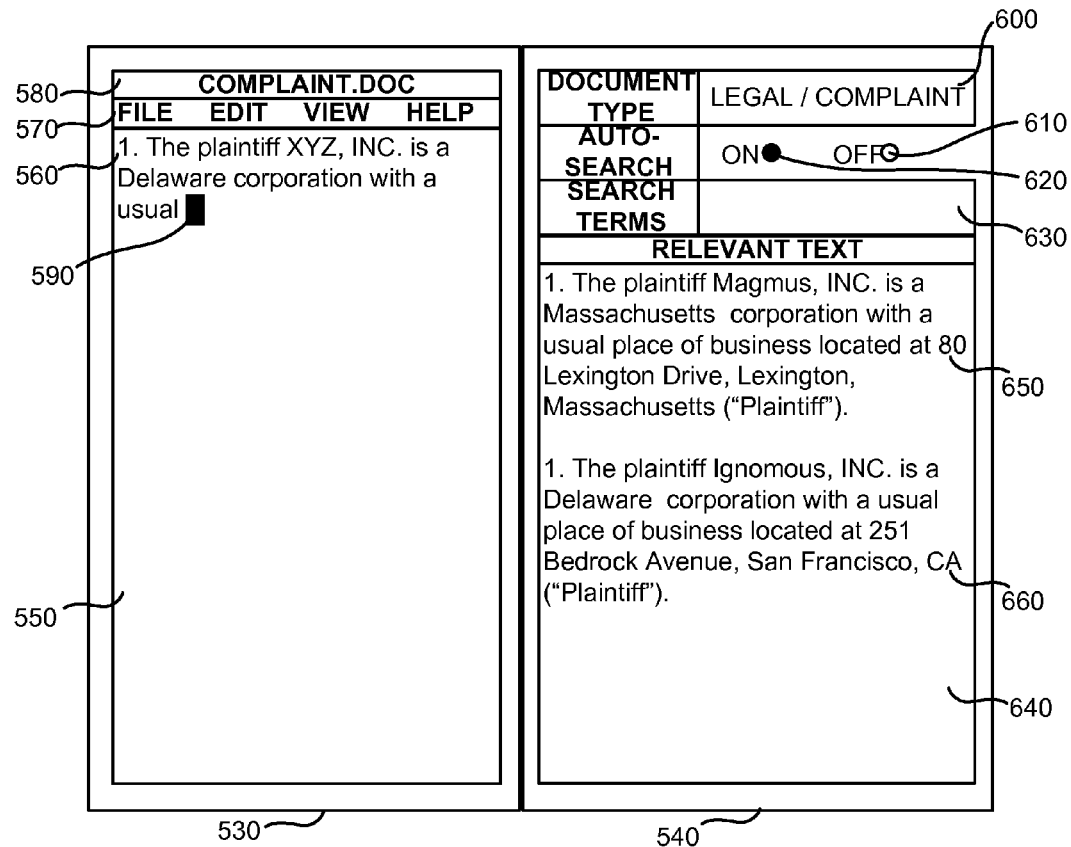
FIG. 5 illustrates a schematic of user interface for a document assembly system, in accordance with one embodiment.

FIG. 5 is a schematic of user interface for a document assembly system. In some embodiments, the user interface may be such that presented relevant text and the document being written are simultaneously viewable by the user. The user interface of the document assembly system may include a word processing window 530 and a relevant text window 540 that may be viewable simultaneously by the user. Word processing window 530 and relevant text window 540 may be generated by separate processes or by the same process. Word processing window 530 and relevant text window 540 may be daughter windows in a parent window (not shown) that may be generated by one or more processes.

In one embodiment, word processing window 530 may be generated by a word processing application, such as Microsoft® Word word processor. Relevant text window 540 may be generated by a separate application that may interface with the word processing application; for example, the separate application may interface with the running session of Microsoft Word with the use of Visual Basic for Applications (VBA). In some embodiments, relevant text window 540 may be generated by an add-on to a word processing application that generates word processing window 530. Such an add-on for the Microsoft® Word word processor may be developed using VSTO (Visual Studio Tools for Office).

Word processing window 530 may include a document viewing field 550, in which the document text being drafted 560 is presented to the user and in which the user may enter additional text at the location of cursor 590. Word processing window 530 may include menu bar 570 that enables the user to manipulate the document (e.g., document saving/opening, document editing, formatting, etc.). In addition, word processing window 530 may include one or more status indicators, such as status line 580 that may be used to display information about the document being drafted, including but not limited to the document name and/or location.

Relevant text window 540 may include document type field 600 that enables the user to select the type of document he is drafting. The search and hence the relevant text presented to the user may be restricted to search results from a document database of the specified type of document. Relevant text window 540 may include auto-search selectors (e.g., off button 610 and on button 620) that allow a user to specify whether the search and hence the relevant text should be presented automatically in response to the user drafting the document text, as previously described. Search terms field 630 provides a location for the user to enter search terms and execute a search based on those entered search terms. Relevant text results field 640 provides a location for relevant text results 650 and 660 to be presented to the user.

Figure 6:
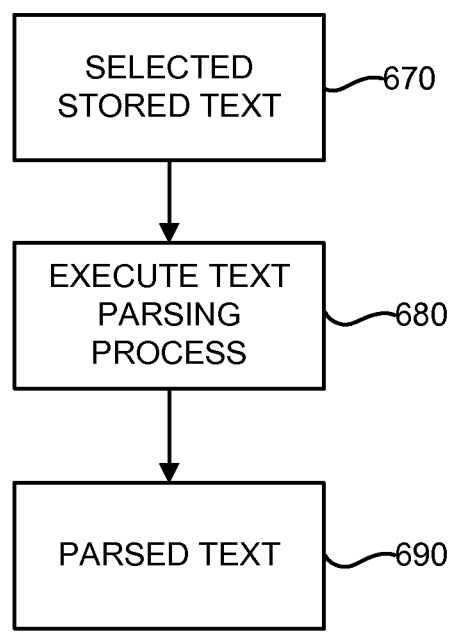
FIG. 6 illustrates a flowchart of a method of parsing in accordance with one embodiment.

FIG. 6 is a flowchart of acts that may be performed by the document assembly system in accordance with at least one embodiment, which may also parse text, as may be implemented by a computer system that may comprise one or more processors. The method may be implemented by a document assembly system that may implement document assembly methods, such as the methods previously described in the associated text of FIGS. 1 to 4. The parsed text may be used to form a database of text fragments that may be utilized by the text retrieval processes of the document assembly system, such as text retrieval processes 120, 220, and/or 360.

The document assembly system may provide selected stored text (act 670) to the computer system, as may be selected by a user. The selection of the stored text may be provided by a user via a user interface (e.g., of a document assembly system), by a configuration file (e.g., that may be accessed by a document assembly system), or by any other suitable technique. For example, a user may select a collection of documents (e.g., one or more documents) stored on one or more storage systems. The stored text may comprise text stored in non-volatile (e.g., storage devices such as hard disks, optical discs, magnetic tape, flash devices) and/or volatile memory devices (e.g., RAM).

The stored text may include text from one or more documents, where the text may have been written at least in part by the user and/or by others. In some embodiments, the stored text may include text from a document that is presently open and which the user may be presently drafting or editing. In some embodiments, the stored text may include text from one or more documents that are presently not open. In some embodiments, the stored text is stored directly as text characters, thereby not requiring a text extraction process.

The computer system may execute a text parsing process (act 680) on the selected stored text and generate parsed text 690. Parsed text 690 may be stored in a database, such as SQL Server database, which is used in the preferred embodiment. Hence, parsed text may be stored text, as the term used herein.

In one embodiment, the text parsing process may begin with the conversion of the contents of a document being parsed from the format in which the document is stored (e.g., RTF, DOCX) into plain text. A subsequent step may include the separation of the text into a plurality of sentences utilizing one or more sentence boundary disambiguation methods. In some embodiments, one or more sentences (e.g., all sentences) of the plurality of sentences in the document may be subjected to tree-parsing utilizing entropy-based techniques commonly used in natural language processing (NLP) algorithms. Tree-parsing may result in obtaining (e.g., for one or more sentences, possibly all sentences) a set of text chucks, as previously described. In some embodiments, text chucks may be subjected to further processing, which may include identifying parts of speech (POS), identifying words that may serve as keywords, and/or computing various metrics that may facilitate the ranking of the search results.

In some embodiments, the document parsing process may include clustering. Clustering may include computing a characteristic value (e.g., integer type value) for each text chunk that is at least partially associated with the keyword composition of the chunk, for example utilizing hashing algorithms. When text chunks are merged in a database (e.g., a relational database) the characteristic value may serve as a clustering metric that allows similar chunks to be grouped. Such clustering is intended to facilitate and speed-up the search process for large databases. In some embodiments, association of text chunks with keywords, their storage in the database, and/or updating of the respective indexing structures may also be part of the parsing process for a given document.

In other embodiments, clustering may be performed based on other parameters or metrics. Paragraphs, sentence sequences, sentences, sentence chunks, or combinations thereof may be clustered based on similarities therebetween. For example, chunks that have a predetermined number or percentage of the same (or similar) words may be clustered together. Hence, for instance, during parsing of documents, the computer system may determine whether the chunks contain the same or similar words, the percentage of such words, and whether such chunks should be clustered together. The computer system also may calculate a metric (such as an integer) that may represent a particular arrangement of parts of speech within a chunk. Moreover, the integer computation, such as hashing, may include removal of certain parts of speech (e.g., articles) and subsequently computing the hash integer. Furthermore, the computer system may change one or more words to a predetermined form (e.g., change words from plural to singular) and may subsequently compute the hash integer, which may be used for clustering the chunks, sentences, etc.

Figure 7:
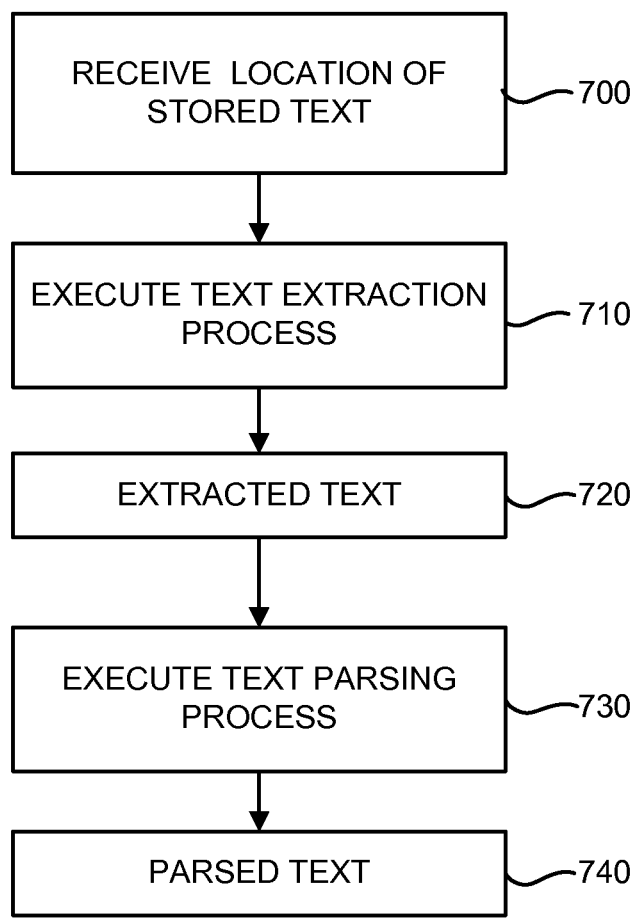
FIG. 7 illustrate a flowchart of a method of parsing in accordance with another embodiment.

FIG. 7 is a flowchart of acts that may be performed by the document assembly system in accordance with one or more embodiments, which may include parsing text, as may be implemented by a computer system that may comprise one or more processors. The method may be implemented by a document assembly system that may implement document assembly methods, such as the methods previously described in the associated text of FIGS. 1 to 4. The parsed text may be used to form a database of text fragments that may be utilized by the text retrieval processes of a document assembly system, such as text retrieval processes 120, 220, and/or 360.

The method may include the computer system receiving one or more locations of stored text (act 700). The one or more locations of stored text may include, but is not limited to, the locations of one more file folder(s) and/or one or more file archives (e.g., compressed file achieves). Documents within the file folders and/or file archives may include encoded stored text that will be extracted and parsed by the computer system.

The computer system may execute a text extraction process on the stored text (act 710). The extraction process may include generating extracted text 720 from stored text by using suitable data decoding methods for the encoded stored text. For example, the text extraction process may include converting one or more Microsoft Office Binary files (.DOC), Open Office XML files, and/or a PDF files to text. In some embodiments, the text extraction process may include de-compressing compressed text data.

The computer system may then execute a text parsing process (act 730) on the extracted text (act 720) so as to generate parsed text 740, as previously described for text parsing process 680 of the previous method.

Figure 8:
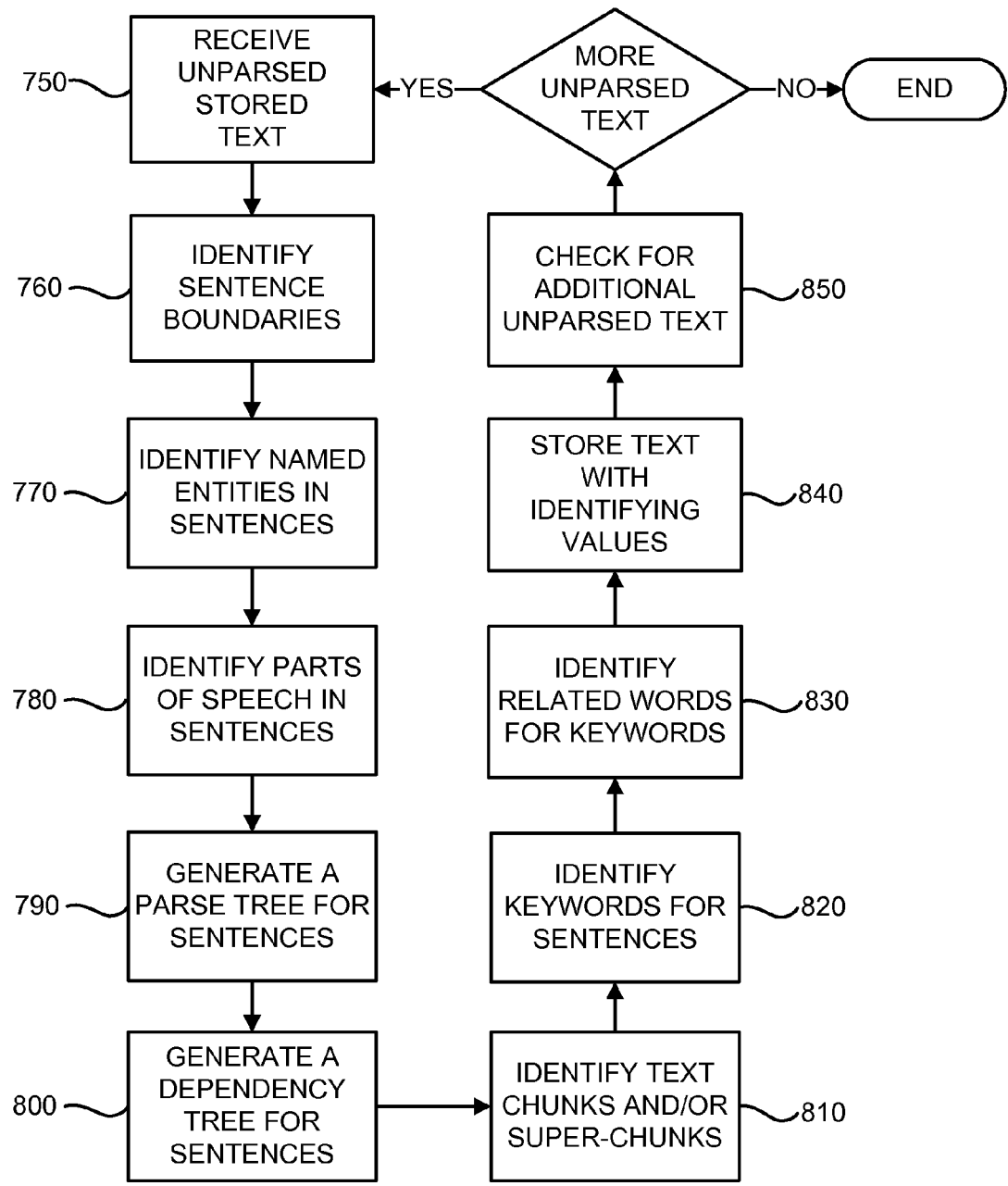
FIG. 8 illustrates a flowchart of a method of parsing in accordance with yet one other embodiment.

FIG. 8 is a flowchart of acts performed by the document assembly system in accordance with one embodiment, which may include parsing text, as may be implemented by a computer system that may comprise one or more processors. The method may be implemented by a document assembly system that may implement document assembly methods, such as the methods previously described in the associated text of FIGS. 1 to 4. The parsed text may be used to form a database of text fragments that may be utilized by the text retrieval processes of a document assembly system, such as text retrieval processes 120, 220, and/or 360.

The method may include a computer system receiving one or more segments or chains of unparsed text (act 750), such as a sentence segment, a sentence, a paragraph, multiple paragraphs, or other general text. The unparsed text may be stored on a computer-readable media, prior and subsequent to the parsing process. For example, the unparsed text may be stored in document files accessible by a word processing application, such as Microsoft® Word document files, which may be stored on a computer-readable media, such as an internal hard drive.

The method may include a computer system identifying sentence boundaries (act 760), which demarcates the beginning and end of sentences. There are numerous methods known to those of ordinary skill in the art, which may be utilized to identify sentence boundaries, for all or some of the sentences in a text, which may (but does not have to be) the received unparsed text (from act 750). For example, sentence boundary demarcation algorithms used in the Open NLP project (http://incubator.apache.org/opennlp/) or Sharp NLP project (http://sharpnlp.codeplex.com/) may be used to determine the start and end of a sentence.

The method may include a computer system identifying named entities in the identified sentences (act 770). There are various algorithms known to those of ordinary skill in the art that may be used to determine the named entities in a sentence. For example, an algorithm utilized by the mentioned Open NLP suite may be used to identify named entities in a sentence. A text may (but does not have to) be a parsed text, with identified sentence boundaries.

The method may include a computer system identifying parts of speech for sentences (act 780). There are various algorithms that may be used to identify parts of speech within a sentence, which are known to those of ordinary skill in the art. For example, an algorithm utilized by the mentioned Open NLP suite may be used to identify the parts of speech.

The method may also include a computer system generating a parse tree for sentences (act 790). Similarly, there are various algorithms known to those of ordinary skill in the art, which may be used to generate parse trees for sentences. The method may also include a computer system generating dependency trees for sentences (act 800).

The method may include a computer system identifying sentence chunks and/or super-chunks (act 810). The chunks and super-chunks may be formed of various numbers of words and may comprise one or more verbs in combination with other parts of speech, as may be defined by the chunk generating algorithm(s) and/or, if/where permitted by the algorithm, as defined by a user. For example, an algorithm utilized by the previously mentioned Open NLP suite may be used to generate chunks.

The method may include a computer system identifying keywords in a sentence (act 820). There are various methods for designating keywords in a sentence, which are known to those of ordinary skill in the art. The method may be rule-based and/or may designate specific words or word types (e.g., part of speech, named entities, etc.) as keywords. Similarly, the method may designate specific words or word types to be excluded from keywords.

The method may include a computer system identifying words that are related to the keywords (act 830). The computer system may identify synonym words that may be used in conjunction with or in lieu of the keywords. For example, for the word car a synonymous word automobile may be identified; similarly, related words (more specific and/or more general than the keyword), such as Ford or vehicle or SUV, may be identified by the computer system.

The method may include a computer system storing the parsed text as well as identifying values (act 840). Identifying values may be, for example, the parameters identifying the beginning and ending of a sentence. The text and corresponding identifying values may be stored in a database, for example an SQL database, on any computer-readable media.

The method may include a computer system checking for availability of additional unparsed text after the received unparsed text has been parsed by the one or more of the parsing processes identified in the method of FIG. 8 (act 850). The method may actively search for additional unparsed text on a designated computer-readable media or may standby to receive additional unparsed text, as identified by a user. If the method receives an indication that there is additional unparsed text, whether from a user or after locating the same, it may commence the process of receiving the unparsed text (act 750) and may subsequently parse the unparsed text.

For one or more of the methods described herein, such as the methods described above (e.g., one or more of the methods illustrated in the flowcharts of FIGS. 1-4 and 5-8), one or more of the acts of the method may be performed automatically by the computer system, without requiring user input. In some embodiments, all of the acts of the method (e.g., one or more of the methods illustrated in the flowcharts of FIGS. 1-4 and 5-8) may be performed automatically by the computer system, without requiring user input.

Figure 9:
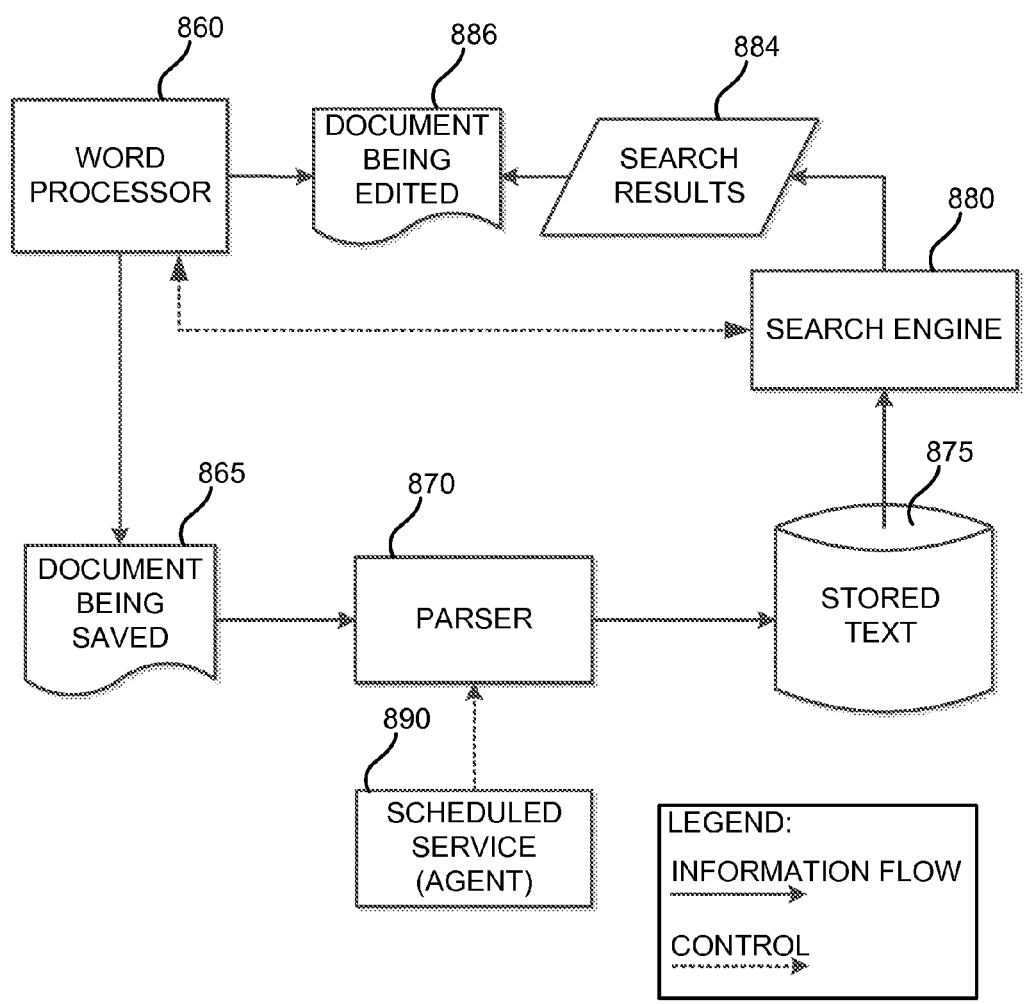
FIG. 9 illustrates a block diagram of a document assembly system, in accordance with one embodiment.

FIG. 9 is a block diagram of an illustrative embodiment of a document assembly system, as may be implemented by a computer system that may comprise one or more processors. The document assembly system may include a word processor application 860, a parser 870, a search engine 880, and/or a scheduled service agent 890. Parser 870 may translate documents (e.g., saved document 865) to a plain text format, identify sentence boundaries, tree-parse sentences, identify parts-of-speech, identify keywords, compute metrics, cluster text chunks, index text, and/or store parsed text. Scheduled service agent 890 may initiate the parsing of new documents at scheduled times and/or dates, and/or at least partially based on a detection of a number and/or total size of new documents that have not yet been parsed. During operation of word processor 860, a user may be presented relevant search results from stored text 875 (e.g., in a database, such as a relational database), and that selected portions of the search results 884 may be added to the document being edited 886 in response to the user's instructions.

Figure 10:
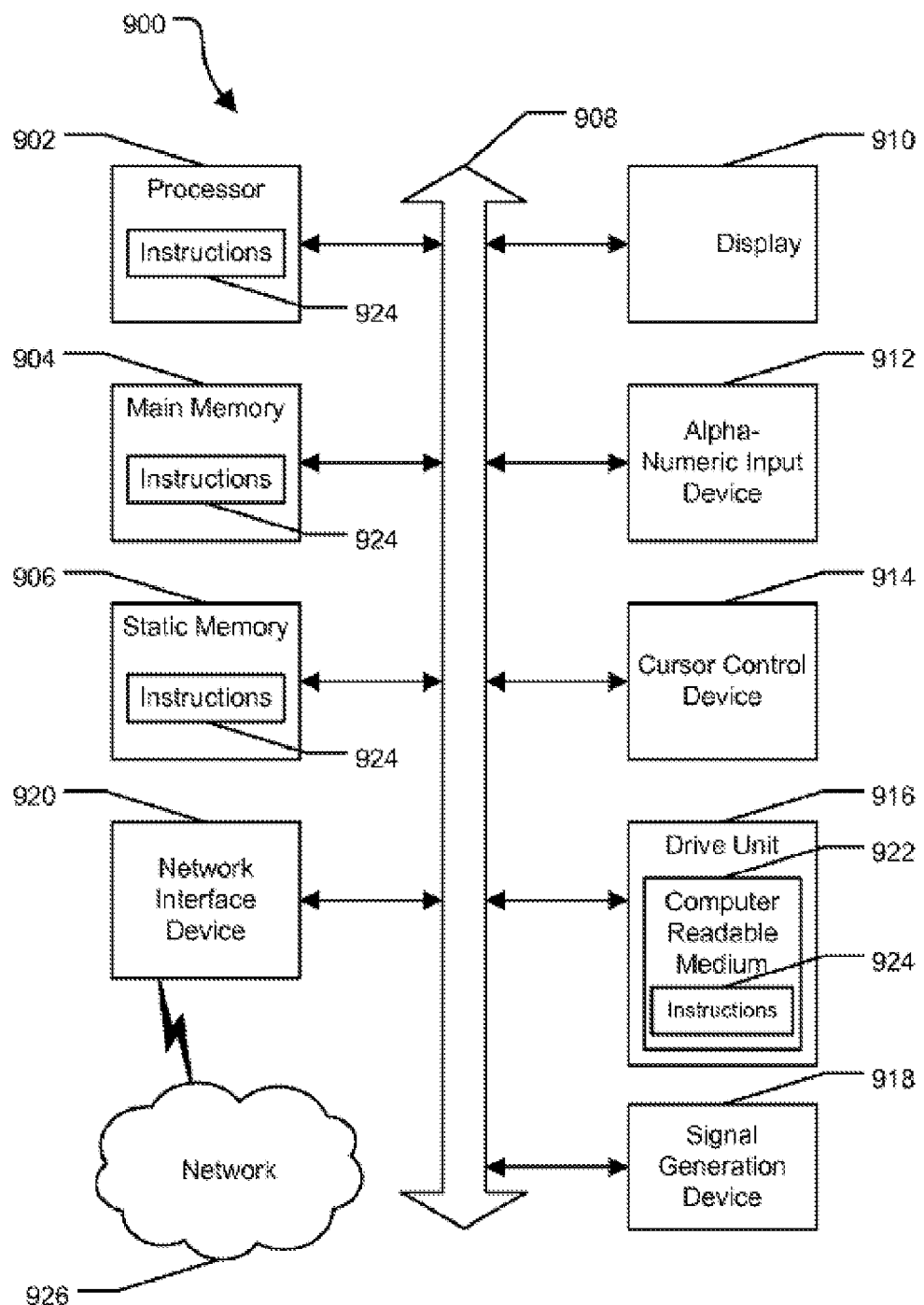
FIG. 10 illustrates a block diagram of a computer system in accordance with one embodiment.

FIG. 10 is a block diagram of an illustrative embodiment of a general computer system 900 in accordance with at least one embodiment of the present disclosure. Computer system 900 also includes a set of instructions that may be executed to cause computer system 900 to perform any one or more of the methods (or parts of one or more of the methods) or computer based functions disclosed herein. Computer system 900 may operate as a standalone device or may be connected via a network to other computer systems or peripheral devices.

In a networked deployment, computer system 900 operates in the capacity of a server or as a client computer in a server-client network environment, or as a peer computer system in a peer-to-peer (or distributed) network environment. Computer system 900 may also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a smayner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 900 is implemented using electronic devices that provide voice, video or data communication. Further, while computer system 900 is illustrated as a single system, the term "system" shall also be taken to include any collection of systems or sub-systems that individually or jointly execute a set, or multiple sets, of instructions to perform one or more computer functions.

Computer system 900 includes a processor 902 such as a central processing unit (CPU), a graphics processing unit (GPU), or both. Moreover, computer system 900 includes a main memory 904 and a static memory 906 that communicate with each other via a bus 908. Computer system 900 further includes a display unit 910, such as a liquid crystal display (LCD), an organic light emitting diode (OLED), a flat panel display, a solid state display, or a cathode ray tube (CRT). It should be noted that the display unit 910 may comprise a single display or monitor or multiple displays or monitors. Additionally, computer system 900 includes an input device 912, such as a keyboard, and a cursor control device 914, such as a mouse. Computer system 900 also includes a disk drive unit 916, a signal generation device 918, such as a speaker or remote control, and a network interface device 920.

A "network" is defined as one or more data links that enable the transport of electronic data between computer, computer systems and/or modules, and/or other electronic devices as well as any combination thereof. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

In some embodiments, disk drive unit 916 includes a computer-readable medium 922 in which one or more sets of instructions 924 are embedded. Instructions 924 embody one or more of the methods or logic as described herein. In a particular embodiment, instructions 924 reside completely, or at least partially, within main memory 904, static memory 906, and/or within processor 902 during execution by computer system 900. Main memory 904 and processor 902 also include computer-readable media. Network interface device 920 provides connectivity to a network 926 such as a wide area network (WAN), a local area network (LAN), or other network. The present disclosure contemplates a computer-readable medium that includes instructions 924 or receives and executes instructions 924 responsive to a propagated signal, so that a device connected to network 926 may communicate voice, video or data over network 926. Further, instructions 924 may be transmitted or received by network 926 via network interface device 920.

In some embodiments, dedicated hardware implementations such as application specific integrated circuits, programmable logic arrays and other hardware devices may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, or hardware implementations, or a combination thereof.

In accordance with various embodiments of the present disclosure, the methods described herein are implemented by software code executable by a computer system (i.e., the computer system may include computer-executable instructions that perform various acts described herein). Further, in an exemplary, non-limited embodiment, implementations may include distributed processing, component/object distributed processing, and parallel processing. Alternatively, virtual computer system processing may be constructed to implement one or more of the methods or functionality as described herein.

Computer-executable instructions comprise, for example, instructions and data which, when executed at a processor, cause a general purpose computer, special purpose computer, or special purpose processing device to perform a certain function or group or series of functions. The computer executable instructions may be, for example, binaries, intermediate format instructions such as assembly language, or source code. Although the subject matter has been described in language specific to structural features and/or methodological acts, it is to be understood that the subject matter defined in the claims is not necessarily limited to the specific embodiment, features, or acts described above. In other words, the embodiments, features, and acts are disclosed as examples of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, routers, switches, and the like. Accordingly, the computer system may include multiple computers connected over the network. Furthermore, any one of the multiple computers comprising the computer system can perform any number of the acts described herein. Hence, one or more acts may be performed on a computer being utilized by the user and one or more acts may be performed by another computer, connected (e.g., via a network) to the computer being utilized by the user—together, the computers may comprise the computer system performing the acts described herein. In other words, the invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, the computer system may be used for reusing or recycling previously created text. Such text may be previously created by one or more users or by a third party. For instance, the computer system may parse previously created legal documents and store parsed text therefrom (e.g., create stored text). As the user is creating a particular document, and more specifically, as the user types words in the document, the computer system may capture a predetermined number of those typed words (as described above) in a form of an entry provided to the computer system. Thereafter, the computer system may provide the user with phrases (i.e., sentence chunks), sentence, paragraphs, etc., from previously created documents, based on the entry (i.e., the words) entered by the user. Hence, the user may automatically obtain relevant text from previously created documents, while the user is creating a new document and/or modifying and exiting document.

In other embodiments, the computer system may reuse text from other types of documents, such as medical notes. Particularly, the computer system may parse previously created medical notes to obtain the stored text. Furthermore, as described above, the computer system also may identify, tag, remove, etc., named entities. For instance, the computer system may tag and/or remove named entities such as date, patient's name, weight, etc. As the user (e.g., a physician) is creating a document, such a SOAP (subjective, objective, assessment, and plan) note, the computer system may retrieve relevant text from the stored text (notably, in this embodiment, the stored text may consist of previously created, parsed SOAP notes).

As described above, the user may provide an entry to the computer system in numerous ways. Hence, for example, the user may begin dictating the SOAP note, and as the user dictates (or dictates a predetermined minimum number of words), the computer system may provide relevant text (retrieved from previously created SOAP notes, which had been parsed and may comprise the stored text), based on the dictated words (i.e., based on the entry provided by user). Alternatively, the user may type or begin typing the SOAP note, and as the user types, the computer system may display the relevant text to the user. As mentioned above, the relevant text may be displayed simultaneously with the text being entered by the user, whether via dictation, keyboard strokes, or other entry methods.

Although the above description relates to legal and medical documents, it should be appreciated that this invention is not so limited. Accordingly, in other embodiments, the computer system may parse any number of other types of documents. Hence, the stored text, likewise, may comprise any number of sentence chunks, sentences, sentence sequences (i.e., multiple sentences that do not form a paragraph), paragraphs, and combinations thereof. Moreover, the computer system may provide relevant text for any number of types of documents being created by the user based on entries received from the user.

In some embodiments, the computer system also may automatically replace previously identified named entities. Hence, certain named entities may be contained in one or more predetermined locations (e.g., name, date, address), and may be automatically substituted in place of the identified named entities in the relevant text. For instance, in a document that requires a name (e.g., name of a plaintiff), the computer system may automatically substitute the identified named entities with the name that correspond to such field. More specifically, the name may be contained in another program, list, database, spreadsheet, or other storage form and may be retried by the computer system automatically, after the user has identified a set of new named entities that should replace the identified named entities.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer system for assembling a document, the computer system comprising:
   one or more processors;
   a system memory;
   a display capable of providing information to a user, the display controlled by the one or more processors; and
   one or more computer-readable storage media having stored thereon computer-executable instructions that, when executed by the one or more processors perform the acts of:
      receiving an entry from the user, the entry comprising a predetermined number of words counted to the left of a current position of a cursor in the document;
      after receiving the entry, retrieving a plurality of relevant texts from stored text, retrieving the plurality of relevant texts being at least partially based on the entry from the user;
      after retrieving the plurality of relevant texts from the stored text, displaying the relevant texts on the display;
      after displaying the retrieved relevant texts on the display, receiving at least one selection of the relevant texts from the user; and
      after receiving the at least one selection of the relevant text, adding to the document the relevant text from the at least one received selection of the relevant texts.

2. The computer system of claim 1, wherein the acts further comprise removing at least one named entity from the stored text before receiving the entry from the user.

3. The computer system of claim 2, wherein removing at least one named entity from the stored text includes tagging.

4. The computer system of claim 1, wherein the act of adding to the document the relevant text from the at least one received selection of the relevant texts comprises adding the received at least one selection of the relevant texts to a selected location in the document.

5. The computer system of claim 1, wherein the relevant texts and the document are displayed concurrently on the display.

6. The computer system of claim 1, wherein the displayed relevant texts are ranked based on one or more predetermined metrics.

7. The computer system of claim 6, wherein the ranking is at least in part based on a readability metric of the relevant texts.

8. The computer system of claim 1, wherein the entry from the user includes text entered by the user in the document.

9. The computer system of claim 8, wherein the text entered by the user in the document includes at least one spoken word transcribed to text.

10. The computer system of claim 2, wherein the at least one named entity removed from the stored text that is in the relevant text from the at least one received selection is automatically replaced with a current named entity from a named entity storage.

11. The computer system of claim 1, wherein the acts further comprise parsing previously created documents to obtain stored text.

12. The computer system of claim 11, wherein the stored text comprises one or more of paragraphs, sentence sequences, sentences, and sentence chunks.

13. The computer system of claim 12, wherein the one or more of paragraphs, sentence sequences, sentences, and sentence chunks are in storage clusters based on predetermined parameters.

14. A computer program product comprising one or more computer-readable storage media having stored thereon computer-executable instructions that, when executed by one or more processors of a computer system, cause the computer system to perform acts of:
   receiving an entry from a user, the entry comprising a predetermined number of words counted to the left of a current position of a cursor in a document;
   after receiving the entry, retrieving a plurality of relevant texts from stored text, retrieving the plurality of relevant texts being at least partially based on the received entry from the user;

after retrieving the plurality of relevant texts from the stored text, displaying the relevant texts on a display;

after displaying the retrieved relevant texts on the display, receiving at least one selection of the relevant texts from the user; and after receiving the at least one selection of the relevant text, adding to the document the relevant text from the at least one received selection of the relevant texts.

15. The computer program product of claim 14, wherein the acts further comprise:

an act of parsing previously created documents to obtain one or more of paragraphs, sentence sequences, sentences, and sentence chunks; and an act of adding one or more of paragraphs, sentence sequences, sentences, and sentence chunks into a database to create the stored text.

16. The computer system of claim 14, wherein the received at least one word entry from the user is text entered by the user in the document.

17. A computer system for assembling a document, the computer system comprising:

one or more processors;

a system memory;

a display capable of providing information to a user, the display controlled by the one or more processors; and one or more computer-readable storage media having stored thereon computer-executable instructions that, when executed by the one or more processors perform the acts of:

removing at least one named entity from stored text;

after removing the at least one named entity from the stored text, receiving an entry from the user, the entry comprising a predetermined number of words counted to the left of a current position of a cursor in the document;

after receiving the entry, executing generation of search terms based on the entry received from the user;

after generating the search terms, retrieving a plurality of relevant texts from the stored text that has at least one named entity removed therefrom, retrieving the plurality of relevant texts being at least partially based on the search terms;

after retrieving the plurality of relevant texts from the stored text, displaying the relevant texts on the display;

after displaying the at least one of the retrieved relevant texts on the display, receiving at least one selection of the relevant texts from the user;

after receiving the at least one selection of the relevant text, adding to the document the relevant text from the at least one received selection of the relevant texts.

18. The computer system of claim 17, wherein the acts further comprise training the generation of search terms, and training the generation of search terms is at least partially based on one or more of the frequency of word or word sequence used in the stored text or based on search terms used in connection with subsequent one or more selections made by the user.

19. The computer system of claim 1, wherein the predetermined number is received from the user.

20. The computer system of claim 1, wherein the predetermined number is at least partially based on one or more of a load on a database containing the stored text and data transfer rate.

* * * * *